(12) United States Patent
Yamashita

(10) Patent No.: US 12,462,030 B2
(45) Date of Patent: Nov. 4, 2025

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Takahiro Yamashita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 18/342,552

(22) Filed: Jun. 27, 2023

(65) Prior Publication Data

US 2024/0005002 A1 Jan. 4, 2024

(30) Foreign Application Priority Data

Jun. 29, 2022 (JP) ................................. 2022-104355

(51) Int. Cl.
*G06F 21/00* (2013.01)
*G06F 3/12* (2006.01)
*G06F 21/56* (2013.01)
*G06F 21/57* (2013.01)

(52) U.S. Cl.
CPC ............ *G06F 21/566* (2013.01); *G06F 3/121* (2013.01); *G06F 3/1229* (2013.01); *G06F 21/575* (2013.01); *G06F 2221/033* (2013.01)

(58) Field of Classification Search
CPC ...... G06F 21/566; G06F 3/121; G06F 3/1229; G06F 21/575; G06F 2221/033
See application file for complete search history.

(56) References Cited

U.S. PATENT DOCUMENTS

| 11,010,153 | B2* | 5/2021 | Yagi | ...................... G06F 21/554 |
| 11,126,728 | B2 | 9/2021 | Michishita | |
| 2015/0143097 | A1* | 5/2015 | Yamashita | .......... G06F 9/44505 |
| | | | | 713/2 |
| 2015/0249755 | A1* | 9/2015 | Hayakawa | ......... H04N 1/32566 |
| | | | | 358/1.15 |
| 2020/0293664 | A1 | 9/2020 | Michishita | |
| 2021/0350027 | A1* | 11/2021 | Sakurada | ................ G06F 21/74 |

FOREIGN PATENT DOCUMENTS

JP 2020149164 A 9/2020

* cited by examiner

*Primary Examiner* — Ghazal B Shehni
(74) *Attorney, Agent, or Firm* — Canon U.S.A., Inc. IP Division

(57) ABSTRACT

An information processing apparatus includes one or more memories, and one or more processors. The one or more processors and the one or more memories are configured to retain a program relating to start-up processing obtained from a device, and perform detection processing of detecting whether a falsification is present in the program relating to the start-up processing. The detection processing is performed based on a start-up of the information processing apparatus in a case where information relating to the device satisfies a predetermined condition, even in a state where a setting to execute the detection processing is not set.

18 Claims, 8 Drawing Sheets

FIG. 2A

| INDEX INFORMATION | DEVICE TYPE | CONNECTION INFORMATION (BUILT-IN OR NOT) |
|---|---|---|
| 0 | NETWORK CONTROLLER I/F 106 | × |
| 1 | USB MEMORY 127 | × |
| 2 | USB MEMORY 128 | × |
| 3 | USB MEMORY 129 | × |
| 4 | HDD 103 | ○ |

FIG. 2B

| INDEX INFORMATION | DEVICE TYPE |
|---|---|
| 0 | NETWORK CONTROLLER I/F 106 |
| 1 | USB MEMORY 127 |
| 2 | USB MEMORY 128 |
| 3 | USB MEMORY 129 |
| 4 | HDD 103 |

INFORMATION PROCESSING APPARATUS AND CONTROL METHOD FOR INFORMATION PROCESSING APPARATUS

BACKGROUND

Field of the Disclosure

The present disclosure relates to an information processing apparatus and a control method for the information processing apparatus.

Description of the Related Art

Some recent image forming apparatuses have the falsification detection function of preventing a start-up of a malicious program by performing signature verification processing or the like on a start-up target program to determine whether the program is legitimate in starting-up the program. The falsification detection function may be switchable between "enabled" and "disabled" via a setting menu. In such a case, a user can select reduction of a falsification detection processing time (i.e., disabling falsification detection function) or safety (i.e., enabling falsification detection function).

The start-up target program for the image forming apparatus may be stored in a storage in the image forming apparatus or in an externally connected storage, such as a universal serial bus (USB) memory.

An image forming apparatus discussed in Japanese Patent Application Laid-open No. 2020-149164 performs a falsification detection in a case where the start-up of the image forming apparatus is performed from a cold boot as the start-up mode, and does not perform the falsification detection to prioritize the speed of the start-up in a case where the start-up of the image forming apparatus is performed from the power saving state as the start-up mode.

SUMMARY

According to an aspect of the present disclosure, an information processing apparatus includes one or more memories, and one or more processors. The one or more processors and the one or more memories are configured to retain a program relating to start-up processing obtained from a device, and perform detection processing of detecting whether a falsification is present in the program relating to the start-up processing. The detection processing is performed based on a start-up of the information processing apparatus in a case where information relating to the device satisfies a predetermined condition, even in a state where a setting to execute the detection processing is not set.

Further features of various embodiments will become apparent from the following description of exemplary embodiments with reference to the attached drawings.

BRIEF DESCRIPTION OF THE DRAWINGS

FIGS. 2A and 2B are tables illustrating start-up target devices and whether each of the devices is a built-in device.

DESCRIPTION OF THE EMBODIMENTS

Exemplary embodiments of the present disclosure will be described in detail with reference to the accompanying drawings. Note that the following exemplary embodiments are not intended to limit every embodiment related to the range of the claims, and the combinations of the features described in the following exemplary embodiments are not necessarily essential. In the exemplary embodiments, a description will be provided of an image forming apparatus as an example of an information processing apparatus, but this this is not restrictive.

Figure 1:
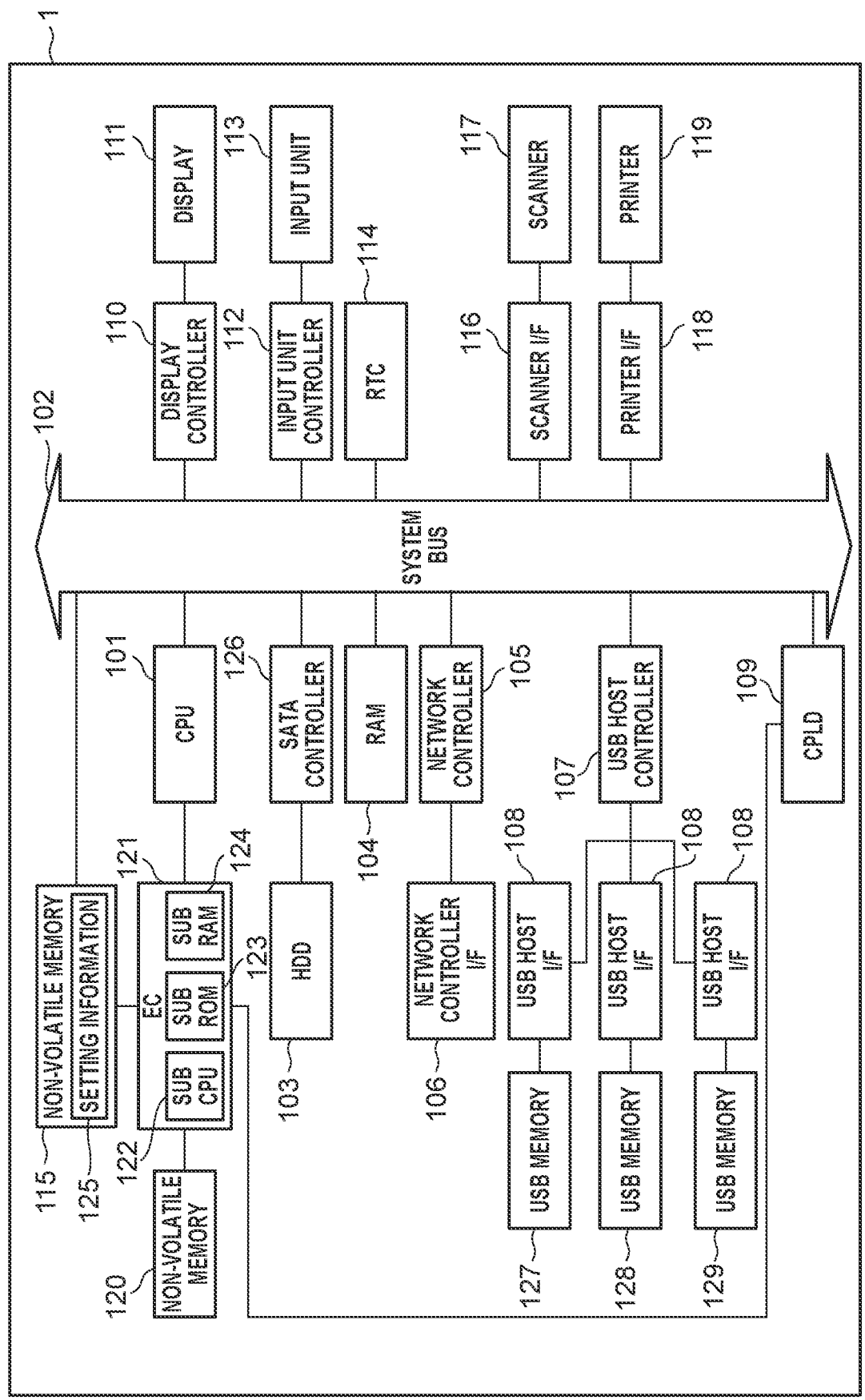
FIG. 1 is a block diagram illustrating a hardware configuration of an image forming apparatus (information processing apparatus).

A first exemplary embodiment of the present disclosure will be described below. FIG. 1 is a block diagram illustrating a hardware configuration of an image forming apparatus 1. The configuration of the image forming apparatus 1 will be described with reference to FIG. 1. The image forming apparatus 1 includes a central processing unit (CPU) 101, a system bus 102, a hard disk drive (HDD) 103, a serial advanced technology attachment (SATA) controller 126, a Random Access Memory (RAM) 104, a network controller 105, and a network controller interface (I/F) 106. The CPU 101 executes software for operating the image forming apparatus 1. The system bus 102 serves as a path for the CPU 101 to access other units, and for the other units to access each other. Under control of the SATA controller 126, the HDD 103 stores software for the image forming apparatus 1, various programs to be used for the operation of the image forming apparatus 1, a database, and temporary storage files. The RAM 104 includes a storage area into which the program for the image forming apparatus 1 is loaded, storing variables used during the program operation, and to which data is transmitted from each unit through Dynamic Memory Access (DMA). The network controller 105 and the network controller OF 106 perform communication between the image forming apparatus 1 and other devices on a network. In the present exemplary embodiment, the HDD 103 is used as an example of a nonvolatile memory, but a solid state drive (SSD) or an Embedded MultiMediaCard (EMMC) may be used as the nonvolatile memory.

The image forming apparatus 1 further includes a universal serial bus (USB) host controller 107, USB host I/Fs 108, a display controller 110, a display 111, an input unit controller 112, and an input unit 113. The USB host controller 107 controls communications between the image forming apparatus 1 and USB devices. Each of the USB host I/Fs 108 is connected to a USB device using a USB cable. Depending on the form of the USB device, each of the USB host I/Fs 108 is directly connected to the USB device without using the USB cable. The display 111 performs display to allow a user to check an operation status of the image forming apparatus 1, and the display controller 110 performs display control on the display 111. The input unit 113 accepts an instruction to the image forming apparatus 1 from a user, and the input unit controller 112 controls the input unit 113. Specifically, the input unit 113 is an input system including a keyboard, a mouse, a numeric keypad, a cursor key, a touch panel, and an operation unit keyboard. In a case where the input unit 113 is a touch panel, the input unit 113 is physically attached onto a surface of the display 111.

The image forming apparatus 1 further includes a real time clock (RTC) 114, a non-volatile memory 115, a complex programmable logic device (CPLD) 109, a scanner OF 116, a scanner 117, a printer OF 118, and a printer 119. The RTC 114 has a clock function, an alarm function, and a timer function, for the image forming apparatus 1. The non-volatile memory 115 is a rewritable memory. The CPLD 109 reads a Low/High status of a signal line on a circuit board via the CPU 101, and enables the CPU 101 to change a setting of the Low/High status of the signal. The CPLD 109 is a programmable logic device that enables the control of OFF/ON of the power system in the image forming apparatus 1. The CPLD 109 includes therein a general-purpose input output (GPIO). The CPU 101 can perform the OFF/ON of the power system by changing a setting value in a GPIO register. The scanner 117 is connected to the image forming apparatus 1 via the system bus 102 and the scanner OF 116. The printer 119 is connected to the image forming apparatus 1 via the system bus 102 and the printer OF 118.

The image forming apparatus 1 further includes an embedded controller (EC) 121 including a sub CPU 122, a sub ROM 123, and a sub RAM 124, and the EC 121 verifies the legitimacy of a Basic Input/Output System (BIOS) program in the non-volatile memory 115. In the EC 121, the sub CPU 122 executes a program in the sub ROM 123 upon energization, which causes the sub CPU 122 to read an Efficient Custom Firmware (ECFW) stored in the non-volatile memory 115, and loads it in the sub RAM 124. The sub CPU 122 verifies whether any falsification of the non-volatile memory 115 is present using the program loaded in the sub RAM 124. The EC 121 is also connected to a non-volatile memory 120 used for backup, and in a case where the EC 121 determines that the non-volatile memory 115 is in an illicit state, the EC 121 copies the contents of the non-volatile memory 120 in the non-volatile memory 115 in an overwrite manner. Further, the non-volatile memory 115 and the non-volatile memory 120 each include setting information 125. The setting information 125 stores a key information to be used for falsification detection, and a setting value which indicates whether to perform the falsification detection, and the like.

To each of the USB host I/Fs 108, a USB device, such as the USB memory 127, is connectable. If the USB memory 127 stores the program for operating the image forming apparatus 1, the image forming apparatus 1 can start up the program in the USB memory 127 instead of the HDD 103. Further, a plurality of the USB host I/Fs 108 may be provided. In the present exemplary embodiment, three USB host I/Fs 108 are provided.

FIGS. 2A and 2B are tables illustrating start-up device information that is a list of start-up devices to be scanned for the presence of the start-up program. FIG. 2A is a table illustrating the start-up device information with three columns, and FIG. 2B is a table with connection information 203 omitted from the table in FIG. 2A. The table in FIG. 2A is explicitly provided with the connection information 203 indicating whether the devices are "built-in", and determination processing described below is performed with reference to the connection information 203.

The table in FIG. 2A is suitable for a system in which an index can be dynamically changed. For example, the table in FIG. 2A is used for a case where the index is dynamically changed, for example, a case where at a first start-up time, the network controller OF 106 is used with the index set to zero, and at a next time and thereafter, the network controller OF 106 is intended to be used with the last index.

The table in FIG. 2B is intended to be used in a system in which the index is determined for each device in advance and the order thereof is fixed. In a case where the table in FIG. 2B is used, which index indicates a built-in device can be determined in advance.

Hereinbelow, FIG. 2A will be described. The table in FIG. 2A illustrates the start-up device information composed of three columns.

The column of the index information 201 includes index numbers, and a unique number is assigned to each device.

The subsequent column of device type 202 is a list of connected devices. The USB memories 127, 128, and 129 may be other USB devices (e.g., USB-HDD or USB-SSD) connected to the USB host I/Fs 108. Each of the USB memories 127, 128, and 129 indicates to which USB host OF 108 it is connected, as illustrated in FIG. 1. In addition, if the device includes a plurality of HDDs, the plurality of the HDDs may be described. The network controller OF 106 is used to obtain the start-up device information from a different PC or a server (not illustrated) connected to the image forming apparatus 1 in advance.

The connection information 203 indicates whether each device is supposed to be built-in. In the present exemplary embodiment, the HDD 103 is supposed to be built in the image forming apparatus 1 and be always connected. The connection information 203 is information to determine whether to set a device to be a falsification detection processing target (described below in a diagram).

In the present exemplary embodiment, whether the device is built-in is used as the information to make the determination, but other standards, such as the presence or absence of encryption processing, may be used. The "built-in" indicates the configuration in which a device is built in the image forming apparatus 1

Figure 3:
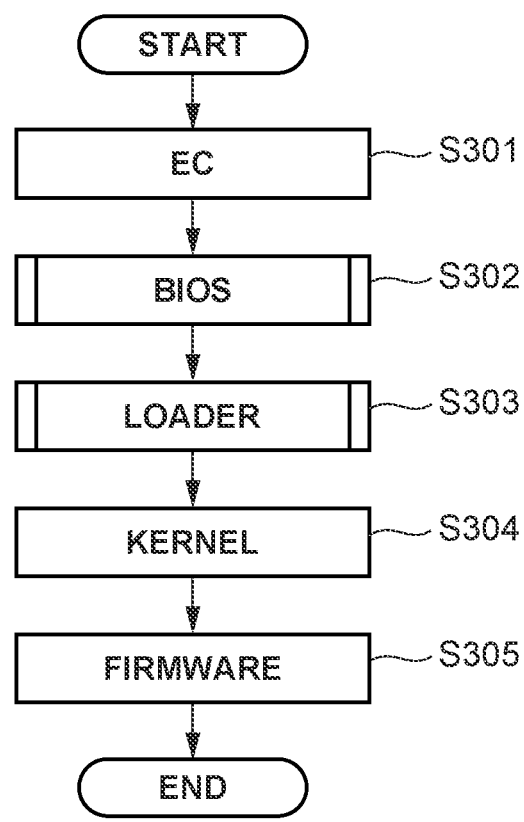
FIG. 3 is a flowchart illustrating an overview of start-up processing.

FIG. 3 is a flowchart illustrating an overview of start-up processing of the image forming apparatus 1.

Figure 4:
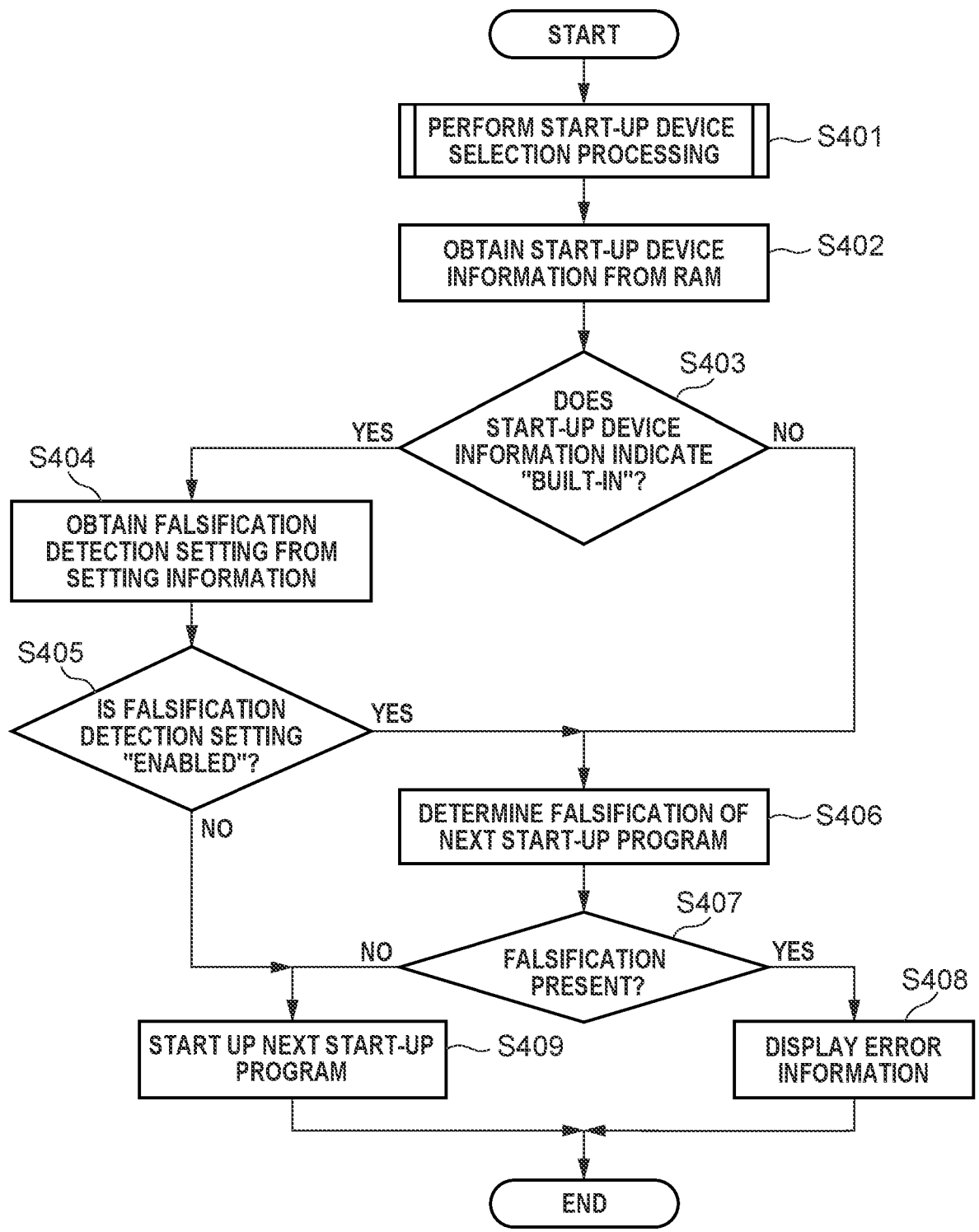
FIG. 4 is a flowchart illustrating execution processing of a start-up program.

Initially in step S301, in response to a power switch being turned ON, the reset of the EC 121 is released, the EC 121 starts reading software for the EC 121 stored in the non-volatile memory 115, and the EC 121 starts operating. The EC 121 determines whether any falsification is present in the BIOS stored in the non-volatile memory 115, and if the EC 121 determines that no falsification is present, the reset of the CPU 101 is released. The EC 121 then starts BIOS processing. Next, in step S302, the CPU 101 executes the BIOS processing. The CPU 101 determines whether any falsification is present in a loader stored in the HDD 103 or the USB memory 127, and the CPU 101 performs initialization processing for each of the hardware devices. If the CPU 101 determines that no falsification of the loader is present, then in step S303, the CPU 101 loads the loader into the RAM 104 from the HDD 103 or the USB memory 127, and starts loader processing. In step S304, the CPU 101 performs falsification determination for a kernel and an initrd stored in the HDD 103 or the USB memory 127. If the CPU determines that no falsification is present, the CPU 101 loads the kernel and the initrd in the RAM 104, and the CPU 101 starts processing of the kernel. In step S305, the CPU 101 performs the falsification determination for each of the pieces of firmware included in the HDD 103 or the USB memory 127, and the CPU 101 sequentially starts up the pieces of the firmware for which no falsification is determined to be present. FIG. 4 is a flowchart illustrating an overview of execution processing of a start-up program in a latter stage executed by executing the BIOS, which is a characterizing feature of the present exemplary embodiment. FIG. 4 illustrates details of the processing in step S302 in FIG. 3, which is executed by the CPU 101. This flowchart is characterized in that an execution determination to determine whether a falsification detection processing is to be executed changes depending on the start-up device information.

Initially in step S401, the BIOS determines and selects which device to use as a start-up device, and performs storage processing of storing the index information 201 for the selected device. The details of this processing will be described with reference to FIG. described below. Next, in step S402, the BIOS obtains from the RAM 104 the index information 201 stored in step S401. In step S403, the BIOS then determines whether the start-up device information indicated by the index information 201 is information indicating "built-in".

More specifically, in step S403, the BIOS performs the determination using the connection information 203 corresponding to the index information 201 obtained in step S402, with reference to the table in FIG. 2A. However, other methods may be used. For example, in a case where the index information 201 and the device type 202 are fixed, whether the start-up device information is information indicating "built-in" may be determined based on the association of the device type 202 with the index information 201.

As a result of the processing in step S403, if the start-up device information is information indicating "built-in" (YES in step S403), the processing proceeds to step S404. In step S404, the BIOS determines whether to perform the falsification detection processing based on the setting information. More specifically, in step S404, the BIOS reads a falsification detection setting value included in the setting information 125 stored in the non-volatile memory 115. The BIOS then determines, in step S405, whether the falsification detection setting is "enabled", using the falsification detection setting value.

Figure 8:
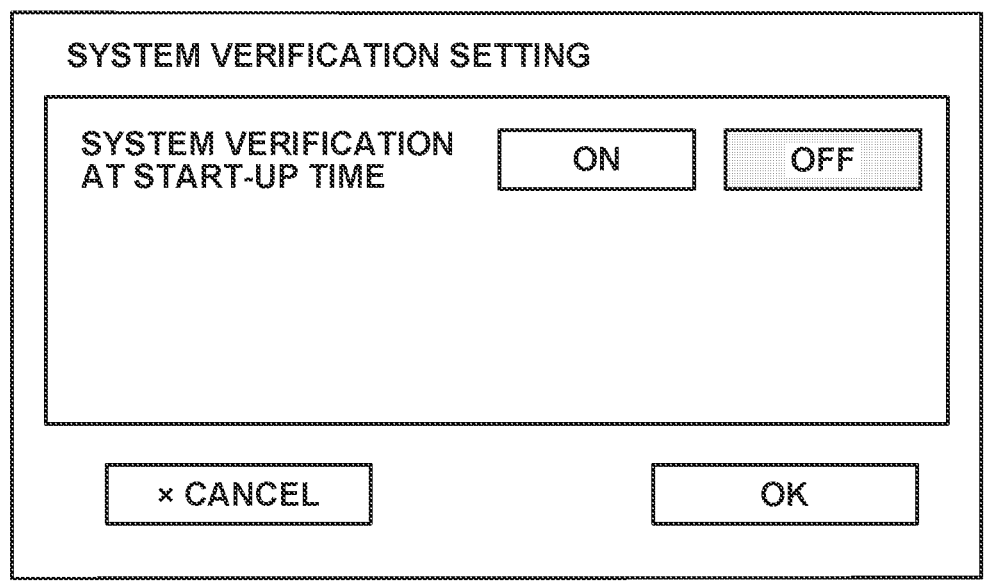
FIG. 8 is a diagram illustrating a user setting screen for a falsification detection function.

The setting whether to perform a falsification detection is made on a user setting screen in FIG. 8. In a case where "ON" is selected, the falsification detection setting value becomes a value indicating "enabled", and in a case where "OFF" is selected, the falsification detection setting value becomes a value indicating "disabled".

If the BIOS determines that the falsification detection setting is "enabled" in step S405 (YES in step S405), the processing proceeds to step S406. In step S406, the BIOS determines whether any falsification is present in the loader which is to be started up next. More specifically, in step S406, the BIOS reads (obtains) the loader to be started up next from the start-up device, retains the loader in the RAM 104, and determines whether any falsification is present in the retained loader. The determination method is not specifically described, but, for example, the BIOS determines whether any falsification is present by performing signature verification processing using a public key and comparing the public key with the correct value stored in advance. Other methods may be used for the determination.

In a case where the BIOS determines, as a result of the determination in step S406, that a falsification is present (YES in step S407), the processing proceeds to step S408. In step S408, the BIOS causes the display 111 to notify the user of error information (e.g., display error screen). The BIOS then stops the start-up processing. If the BIOS determines that no falsification is present (NO in step S407) or that the falsification detection setting is "disabled" (NO in step S405), the processing proceeds to step S409. In step S409, the BIOS reads a loader serving as a next start-up program from a start-up device, and loads the loader in the RAM 104 to execute it.

As described above, if the start-up device information is information indicating "built-in" (YES in step S403), whether to perform the falsification determination processing is determined based on the falsification detection setting.

If the start-up device information is not information indicating "built-in" (NO in step S403), (e.g., a case where the start-up device information indicates the USB memory 127), the processing proceeds to step S406. In step S406, the BIOS performs the falsification determination on the loader in the start-up device without obtaining the falsification detection setting, unlike in step S404.

Figure 5:
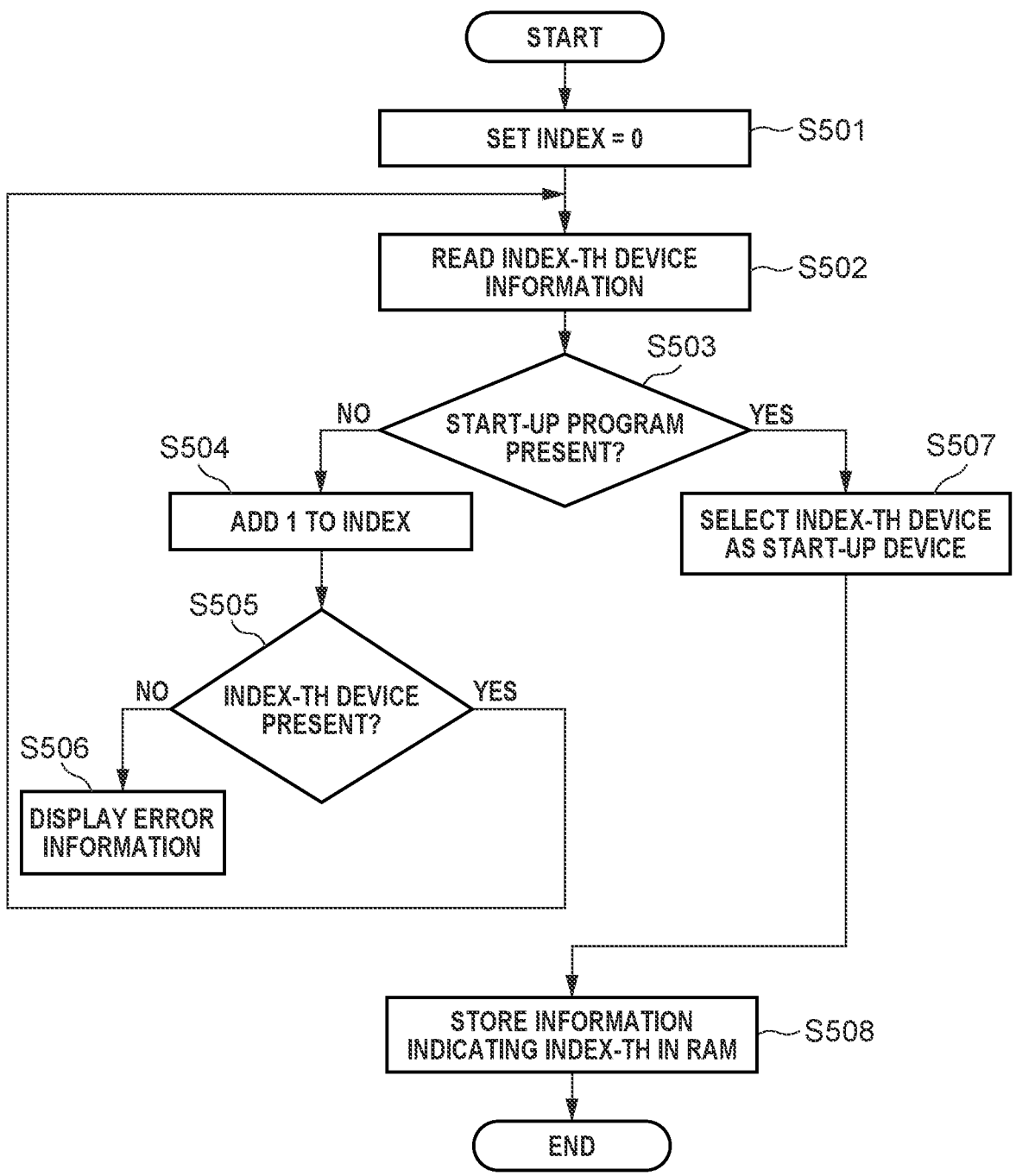
FIG. 5 is a flowchart illustrating processing for selecting a start-up target device.

FIG. 5 is a flowchart illustrating processing of selecting a start-up device. This flowchart is implemented by the CPU 101 executing the BIOS.

This flowchart describes the details of the processing performed in step S401 in FIG. 4. Initially in step S501, the BIOS stores a valuable as index=0 in the RAM 104. Next, in step S502, the BIOS reads the device type 202 indicated by the index from the table in FIG. 2A. For example, for the index=0, the network controller I/F 106 is derived as the device type 202, so that the BIOS sends an inquiry to an external server set in advance. The BIOS obtains a start-up program from the server via the network controller OF 106 and retains the start-up program in the RAM 104. For the index=1, the USB memory 127 is derived as the device type 202, so that the BIOS reads the contents of the USB memory 127 and retains the contents in the RAM 104. In the present exemplary embodiment, while the contents of the USB memory 127 are retained in the RAM 104, it is sufficient that the BIOS checks whether the start-up program is present based on an inquiry command and/or a file list in the processing in FIG. 5.

Next, in step S503, the BIOS checks whether a start-up program is present in the device read in step S502. As the determination method, for example, the BIOS may check whether a file in an executable file format is present on a specific file path on a predetermined file system. In a case of the network controller OF 106, the BIOS may communicate with a desired server, and check whether a file is obtained. Further, any other method may be used, and, for example, the BIOS may check whether the file is present on a predetermined sector.

In step S503, if the start-up program is not present (NO in step S503), the processing proceeds to step S504. In step S504, the BIOS adds one to the index value. Next, in step S505, the BIOS checks whether the device type 202 indicated by the index is present, with reference to the table in FIG. 2A. If the BIOS determines that the device type 202 indicated by the index is not present (NO in step S505) because, for example, the index value is out of the range of the table in FIG. 2A, the processing proceeds to step S506. In step S506, the BIOS renders an error screen on the display 111 and stops the subsequent start-up processing. In a case where the device type 202 indicated by the index is present (YES in step S505), the processing returns to step S502 and the operation in step S502 is repeated.

In step S503, if the BIOS determines that the start-up program is present (YES in step S503), the processing proceeds to step S507. In step S507, the BIOS selects the index-th device as a start-up device. Next in step S508, the BIOS stores the index value in the RAM 104, so that the index value can be referred to in processing in the latter stage. In this way, by referring to the selection result, the BIOS does not need to execute the start-up device selection processing a plurality of times.

Figure 6:
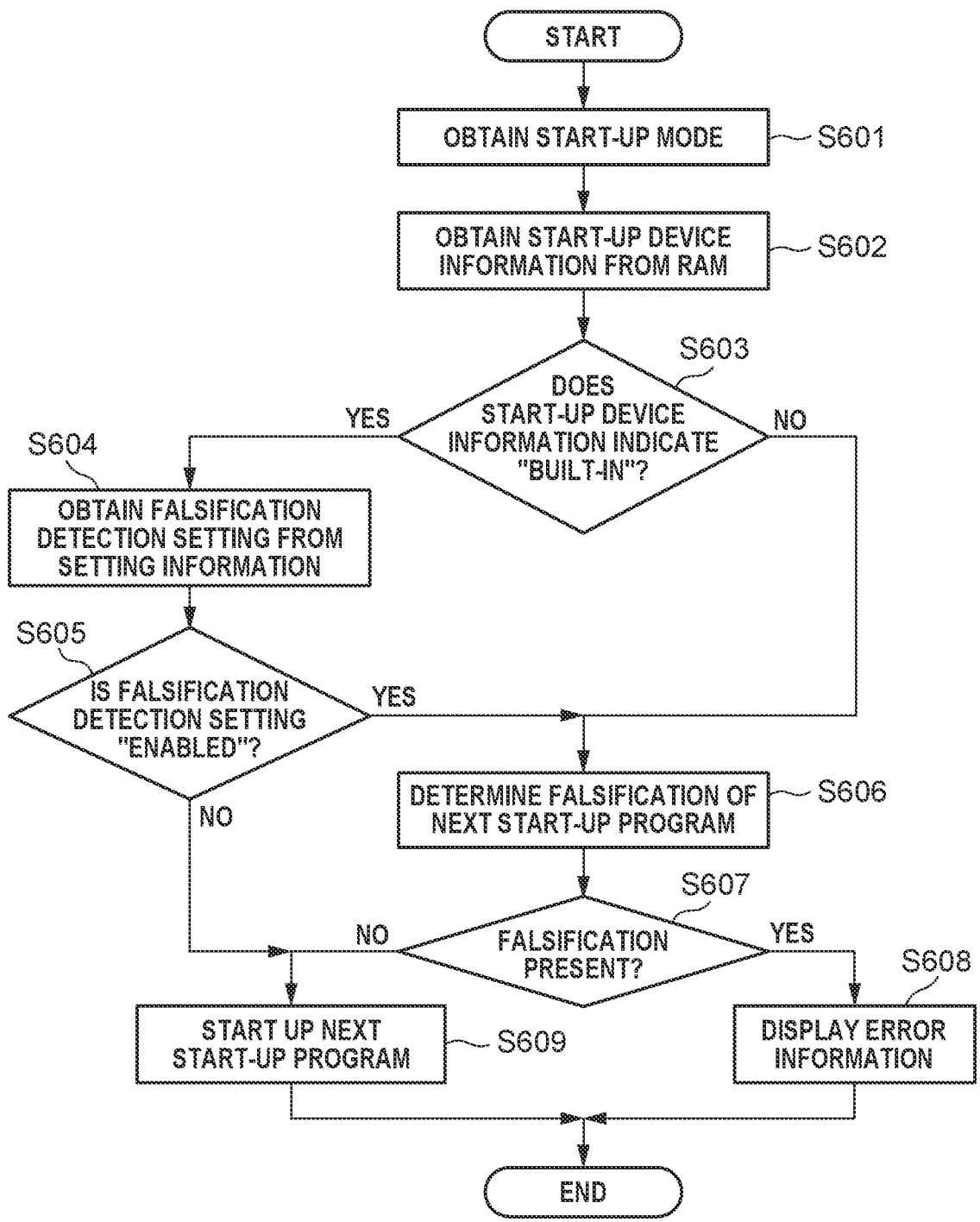
FIG. 6 is a flowchart illustrating execution processing of a start-up program.

FIG. 6 is a flowchart illustrating an overview of start-up processing of a loader. The flowchart in FIG. 6 illustrates an example of processing to be performed by software after the process of the BIOS in which the falsification detection operation is changed depending on the start-up device. The relationship between the start-up processing and the falsification determination processing in the BIOS has been described in conjunction with FIG. 4. A similar behavior about the loader will be next described.

Initially in step S601, the loader determines a start-up mode, for example, by checking whether a predetermined key operation is performed, or a software flag is flagged in the RAM 104.

This operation is to determine which kernel to start up, and with which setting to start up the kernel in the processing that is unique to the loader.

Next in step S602, the loader obtains from the RAM 104 the index information 201 stored in the RAM 104 in step S401 in FIG. 4. In step S603, the loader then determines whether the start-up device information is information indicating "built-in". The determination made in step S603 is similar to that in step S403, so that the description thereof is omitted.

As a result of the determination in step S603, if the start-up device information indicates "built-in" (YES in step S603), the processing proceeds to step S604. In step S604, the loader determines whether to perform the falsification detection processing based on the setting information. More specifically, in step S604, the loader reads a falsification detection setting value included in the setting information 125 stored in the non-volatile memory 115. In step S605, the loader determines whether the falsification detection setting is "enabled", using the falsification detection setting value.

As a result of the determination in step S605, if the loader determines that the falsification detection setting is "enabled" (YES in step S605), the processing proceeds to step S606. In step S606, the loader determines whether any falsification is present in the kernel which is to be started up next. More specifically, the loader reads the kernel to be started up next from the start-up device, retains it in the RAM 104, and determines whether any falsification is present in the retained kernel. The determination method is not specifically described. For example, the loader determines whether any falsification is present by performing signature verification processing using a public key and comparing the public key with the correct value stored in advance. Other methods may be used for the determination.

As a result of the determination in step S606, if the loader determines that the falsification is present (YES in step S607), the processing proceeds to step 608. In step S608, the loader renders an error screen on the display 111, and stops the subsequent start-up processing.

If the loader determines that no falsification is present (NO in step S607) or the falsification detection setting is "disabled" (NO in step S605), the processing proceeds to step S609. In step S609, the loader reads a kernel serving as a next start-up program from the start-up device, retains it in the RAM 104, and executes it. At this time, a kernel corresponding to the start-up mode may be read from among a plurality of kernels, based on the start-up mode determined in step S601. Alternatively, the kernel may be provided with a different setting value based on the start-up mode and be caused to operate.

As described above, if the start-up device is "built-in" (YES in step S603), whether to perform the falsification determination processing is determined based on the falsification detection setting. If the start-up device is not "built-in" (NO in step S603), such as the USB memory 127, the falsification determination for the kernel in the start-up device is always performed (step S606).

According to the configuration of the present exemplary embodiment, it is possible to prevent the start-up of the falsified program by determining whether any falsification is present in the start-up program in a case where the start-up device information is not the information indicating "built-in" (a case where the predetermined condition is satisfied), regardless of the falsification detection setting.

In step S603, while it is determined whether the start-up device information is information indicating "built-in", it may be determined whether the start-up device information may be information indicating an external device. In this case, if it is determined that the start-up device information is information indicating an external device (a case where a predetermined condition is satisfied), the processing proceeds to step S606. If it is determined that the start-up device information is not information indicating an external device (a case where the predetermined condition is not satisfied), the processing proceeds to step S604.

In the present exemplary embodiment, the configuration in which whether any falsification is present in the loader and/or the kernel is determined has been described, but the presence or absence of falsification in a program subsequent to the kernel may be determined in a similar manner.

A second exemplary embodiment of the present disclosure will be described below. In the first exemplary embodiment, the CPU 101 changes whether the falsification detection determination is performed based on whether the device is built-in. In the second exemplary embodiment, an example of performing the change based on a port number of a port into which the USB memory 127 is inserted will be described. The present exemplary embodiment is intended to reduce a possibility of starting-up the falsified program by always performing the falsification determination on the USB port to which a user can freely insert and remove a USB device, from among the ports, for example, in a case where the image forming apparatus 1 is provided with a plurality of the USB host I/Fs 108.

Figure 7:
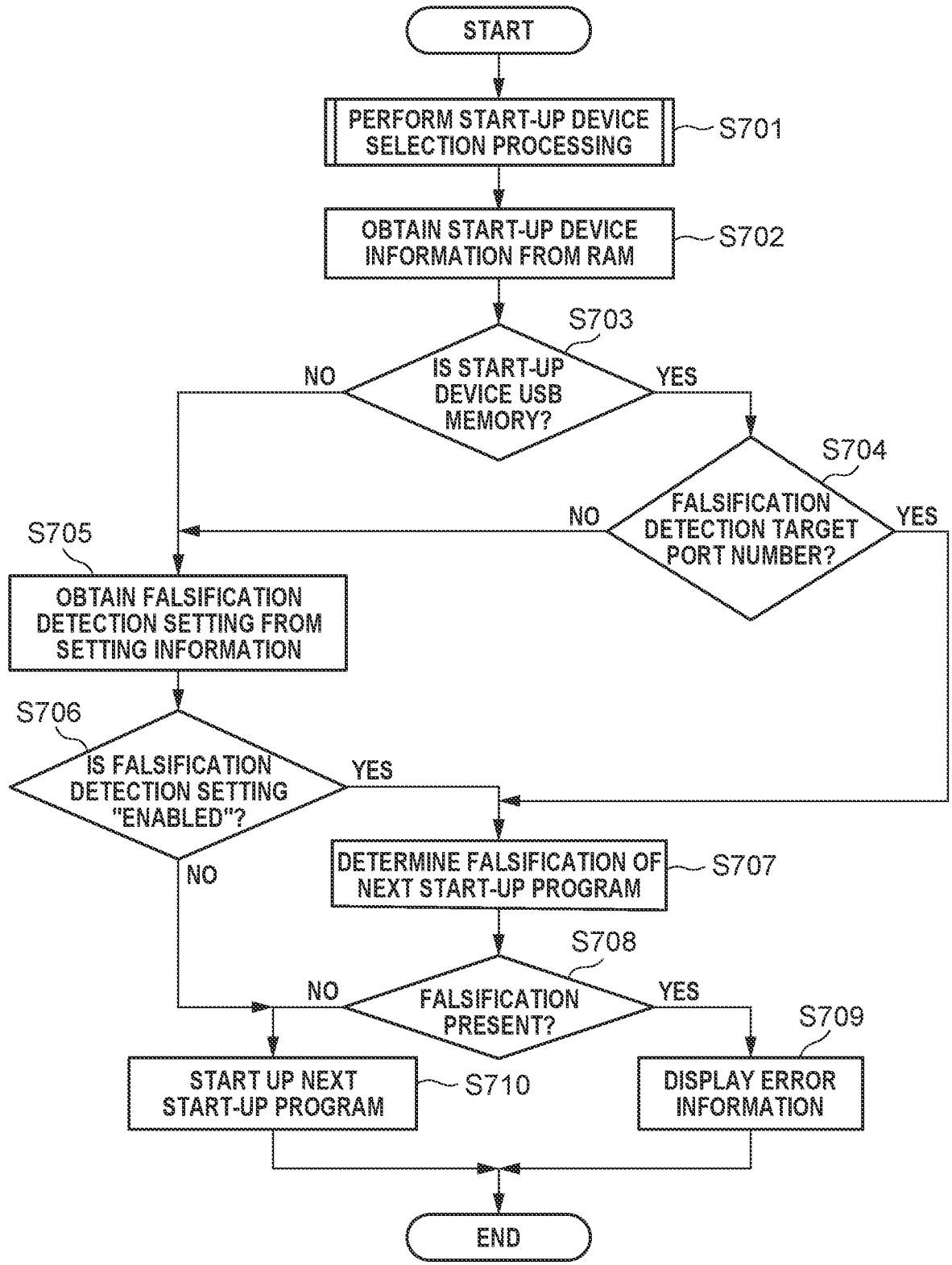
FIG. 7 is a flowchart illustrating execution processing of a start-up program.

FIG. 7 is a flowchart illustrating an overview of start-up processing of a BIOS. FIG. 7 illustrates details of the processing in step S302 in FIG. 3, and the processing is characterized in that the execution determination for the falsification detection processing changes depending on a port number of a port to which the USB memory 127 is inserted. This flowchart is implemented by the CPU 101.

Operations in steps S701, S702, and S705 to S710 in FIG. 7 are similar to those in steps S401, S402, and S404 to S409 in FIG. 4, and thus descriptions thereof are simplified. The operations in steps S703 and S704 in FIG. 7 are different from the operations in FIG. 4, and thus, the details thereof will be described.

As in the processing in FIG. 4, in step S701, the BIOS performs the start-up device selection processing. In step S702, the BIOS obtains the start-up device information from the RAM 104. Next in step S703, the BIOS checks whether the start-up device is the USB memory 127.

If the BIOS determines that the start-up device is the USB memory 127 (YES in step S703), the processing proceeds to step S704. In step S704, the BIOS determines whether the port number is a target port number of the port to be subjected to the falsification determination processing. The target port number is determined in advance. For example, the port number of the port to which and from which a user can feely insert and remove a device is determined to be a falsification detection target port number. In contrast, for a port number of a dedicated port to which an optional card reader is connected, the port number is excluded from the falsification detection target. Thus, for example, in a case where the start-up device is the USB memory 127, it is determined that the USB memory 127 is a falsification detection target, and that the USB memories 128 and 129 are not falsification detection targets. If the port number is the falsification detection target port number (YES in step S704), the processing proceeds to step S707. In step S707, as in step S406, the BIOS determines the presence or absence of a falsification in the loader in the start-up device.

If the port number is not the falsification detection target port number (NO in step S704), the processing proceeds to step S705, and then step S706. In steps S705 and S706, as in steps S404 and S405, the BIOS determines whether to perform the falsification detection processing, based on the setting information. More specifically, in step S705, the BIOS reads the falsification detection setting value stored in the area of the setting information 125. In step S706, the BIOS determines whether the falsification detection setting is "enabled".

In FIG. 7, the configuration corresponding to that in FIG. 4 is described, but the configuration corresponding to that in FIG. 6 (e.g., steps S703 and S704 are included instead of step S603) may be used.

According to the configuration of the present exemplary embodiment, it is possible to switch between execution of the falsification detection processing depending on the port number of the port to which the USB memory 127 is inserted, regardless of the falsification detection setting, and execution of the processing based on the falsification detection setting. Thus, it is possible to prevent the start-up of the falsified program by determining whether the falsification of the start-up program (e.g., loader or kernel) is present.

While the configuration of determining whether any falsification is present in the loader and/or the kernel has been described, a similar process may be performed on the program subsequent to the kernel, also in the present exemplary embodiment.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-104355, which was filed on Jun. 29, 2022 and which is hereby incorporated by reference herein in its entirety.

What is claimed is:

1. An information processing apparatus, comprising: one or more memories; and one or more processors, wherein the one or more processors and the one or more memories are configured to: retain a program relating to start-up processing obtained from a device; perform detection processing of detecting whether a falsification is present in the program relating to the start-up processing, wherein the detection processing is performed based on a start-up of the information processing apparatus in a case where information relating to the device satisfies a predetermined condition, even in a state where a setting not to execute the detection processing is set, wherein the predetermined condition is that the information relating to the device is not information indicating that the device is built in the information processing apparatus, wherein the one or more processors and the one or more memories are further configured to control the detection processing based on the setting, in a case where the information relating to the device is the information indicating that the device is built in the information processing apparatus, and wherein the one or more processors and the one or more memories execute the detection processing based on the start-up of the information processing apparatus in a case where the information relating to the device is not the information indicating that the device is built in the information processing apparatus, even in the state where the setting not to execute the detection processing is set.

2. The information processing apparatus according to claim 1,
wherein the one or more processors and the one or more memories are further configured to execute a different program relating to the start-up processing of the information processing apparatus,
wherein the different program relating to the start-up processing is stored in a non-volatile memory, and wherein the detection processing becomes executable by the execution of the
different program based on the start-up of the information processing apparatus.

3. The information processing apparatus according to claim 2,
wherein the different program relating to the start-up processing is a Basic Input/Output System (BIOS), and
wherein the program relating to the start-up processing is a loader.

4. The information processing apparatus according to claim 2, wherein the one or more processors and the one or more memories are further configured to execute the different program relating to the start-up processing based on the start-up of the information processing apparatus.

5. The information processing apparatus according to claim 1, wherein the one or more processors and the one or more memories are further configured to execute a different program relating to the start-up processing of the information processing apparatus, wherein the program relating to the start-up processing and the different program relating to the start-up processing are obtained from the device and retained in the one or more memories, and wherein the detection processing becomes executable by the execution of the different program relating to the start-up processing.

6. The information processing apparatus according to claim 5, wherein the different program relating to the start-up processing is a loader, and wherein the program relating to the start-up processing is a kernel.

7. The information processing apparatus according to claim 1, wherein the predetermined condition is further that the information relating to the device is information indicating that the device is externally attached to the information processing apparatus, wherein the one or more processors and the one or more memories are further configured to control the detection processing based on the setting in a case where the information relating to the device is not the information indicating that the device is externally attached to the information processing apparatus, and wherein the one or more processors and the one or more memories are further configured to perform the detection processing based on the start-up of the information processing apparatus in a case where the information relating to the device is the information indicating that the device is externally attached to the information processing apparatus, even in the state where the setting not to execute the detection processing is set.

8. The information processing apparatus according to claim 1, wherein the one or more processors and the one or more memories are further configured to perform the detection processing in a case where the predetermined condition is not satisfied, in a state where a setting to perform the detection processing is set.

9. The information processing apparatus according to claim 1, wherein the one or more processors and the one or more memories are further configured to determine whether the information relating to the device satisfies the predetermined condition.

10. The information processing apparatus according to claim 1, wherein the information relating to the device includes an index number, device information, and connection information.

11. The information processing apparatus according to claim 10, wherein the one or more processors and the one or more memories are further configured to select a device to be used to obtain a program, and wherein, to select the device to be used to obtain a program, the one or more processors and the one or more memories determine, in order of the index number, whether the program relating to the start-up processing is stored in a respective device corresponding to the index number, and select a device storing the program relating to the start-up processing as the device to be used to obtain a program.

12. The information processing apparatus according to claim 1, wherein the one or more processors and the one or more memories are further configured to notify a user of information, and wherein, to notify the user of information, the one or more processors and the one or more memories notify the user of an error in a case where the falsification is detected in the program relating to the start-up processing.

13. The information processing apparatus according to claim 1, further comprising a network controller interface (I/F) configured to accept data via a network, wherein the information relating to the device satisfies the predetermined condition in a case where the device is the network controller I/F.

14. The information processing apparatus according to claim 1, wherein the information relating to the device does not satisfy the predetermined condition in a case where the device is a non-volatile memory.

15. The information processing apparatus according to claim 1, wherein the setting is acceptable from a user.

16. A control method for an information processing apparatus including a memory configured to retain a program relating to start-up processing obtained from a device, the control method comprising: setting whether to perform detection processing of detecting whether falsification is present in the program relating to the start-up processing; performing the detection processing based on a start-up of the information processing apparatus in a case where information relating to the device satisfies a predetermined condition, even in a state where a setting not to perform the detection processing is set, wherein the predetermined condition is that the information relating to the device is not information indicating that the device is built in the information processing apparatus; and controlling the detection processing based on the setting, in a case where the information relating to the device is the information indicating that the device is built in the information processing apparatus, wherein the detection processing is executed based on the start-up of the information processing apparatus in a case where the information relating to the device is not the information indicating that the device is built in the information processing apparatus, even in the state where the setting not to execute the detection processing is set.

17. An information processing apparatus, comprising:
one or more memories; and
one or more processors, wherein the one or more processors and the one or more memories are configured to:
retain a program relating to start-up processing obtained from a device;
perform detection processing of detecting whether a falsification is present in the program relating to the start-up processing, wherein the detection processing is performed based on a start-up of the information processing apparatus in a case where information relating to the device satisfies a predetermined condition, even in a state where a setting not to execute the detection processing is set, and wherein the predetermined condition is that the information relating to the device is information indicating that the device is a universal serial bus (USB) memory and that a port number of a port to which the USB memory is connected is a predetermined port number; and
control the detection processing based on the setting, in a case where the information relating to the device is not information indicating that the device is the USB memory or is information indicating that the device is the USB memory and that the port number of the port to which the USB memory is connected is not the predetermined port number.

18. An information processing apparatus, comprising:
one or more memories; and
one or more processors, wherein the one or more processors and the one or more memories are configured to:
retain a program relating to start-up processing obtained from a device;
perform detection processing of detecting whether a falsification is present in the program relating to the start-up processing, wherein the detection processing is performed based on a start-up of the information processing apparatus in a case where information relating to the device satisfies a predetermined condition, even in a state where a setting to execute the detection processing is not set, wherein the information relating to the device includes an index number, device information, and connection information; and
select a device to be used to obtain a program,
wherein, to select the device to be used to obtain a program, the one or more processors and the one or more memories determine, in order of the index number, whether the program relating to the start-up processing is stored in a respective device corresponding to the index number, and select a device storing the program relating to the start-up processing as the device to be used to obtain a program.

* * * * *